(12) United States Patent
Wallace

(10) Patent No.: US 7,313,586 B2
(45) Date of Patent: Dec. 25, 2007

(54) ADDER-SUBTRACTER CIRCUIT

(75) Inventor: Andrew Paul Wallace, Bristol (GB)

(73) Assignee: Broadcom Corporation, Irvine, CA (US)

( * ) Notice: Subject to any disclaimer, the term of this patent is extended or adjusted under 35 U.S.C. 154(b) by 630 days.

(21) Appl. No.: 10/793,036

(22) Filed: Mar. 5, 2004

(65) Prior Publication Data

US 2005/0198094 A1   Sep. 8, 2005

(51) Int. Cl.
*G06F 7/50* (2006.01)
(52) U.S. Cl. .................................. 708/710
(58) Field of Classification Search ......... 708/710–713
See application file for complete search history.

(56) References Cited

U.S. PATENT DOCUMENTS

| | | | |
|---|---|---|---|
| 4,099,248 A * | 7/1978 | Borgerson et al. | 708/711 |
| 4,319,335 A * | 3/1982 | Rubinfield | 708/710 |
| 4,682,303 A | 7/1987 | Uya | |
| 4,764,887 A | 8/1988 | Lai et al. | |
| 5,007,010 A | 4/1991 | Flora | |
| 5,276,635 A | 1/1994 | Naini et al. | |
| 5,278,783 A | 1/1994 | Edmondson | |
| 5,477,480 A | 12/1995 | Inui | |
| 5,487,025 A | 1/1996 | Partovi et al. | |
| 5,500,813 A | 3/1996 | Song et al. | |
| 6,529,931 B1 | 3/2003 | Besz et al. | |
| 7,139,789 B2 * | 11/2006 | Evans | 708/711 |

FOREIGN PATENT DOCUMENTS

| | | |
|---|---|---|
| GB | 2 263 002 | 7/1993 |
| GB | 2 342 193 | 4/2000 |

OTHER PUBLICATIONS

Simon Knowles, "A Family of Adders", IEEE, pp. 30-37, 1999.

* cited by examiner

*Primary Examiner*—Tan V. Mai
(74) *Attorney, Agent, or Firm*—Sterne, Kessler, Goldstein & Fox PLLC

(57) ABSTRACT

An adder-subtracter circuit being adapted to process two binary input numbers in order to generate the sum or the difference of the two processed numbers depending on the state of a subtract input signal. The circuit has the capability to feed back the result of the processing to itself in order to process one input number together with the result of a previous processing instead of the second binary number.

7 Claims, 3 Drawing Sheets

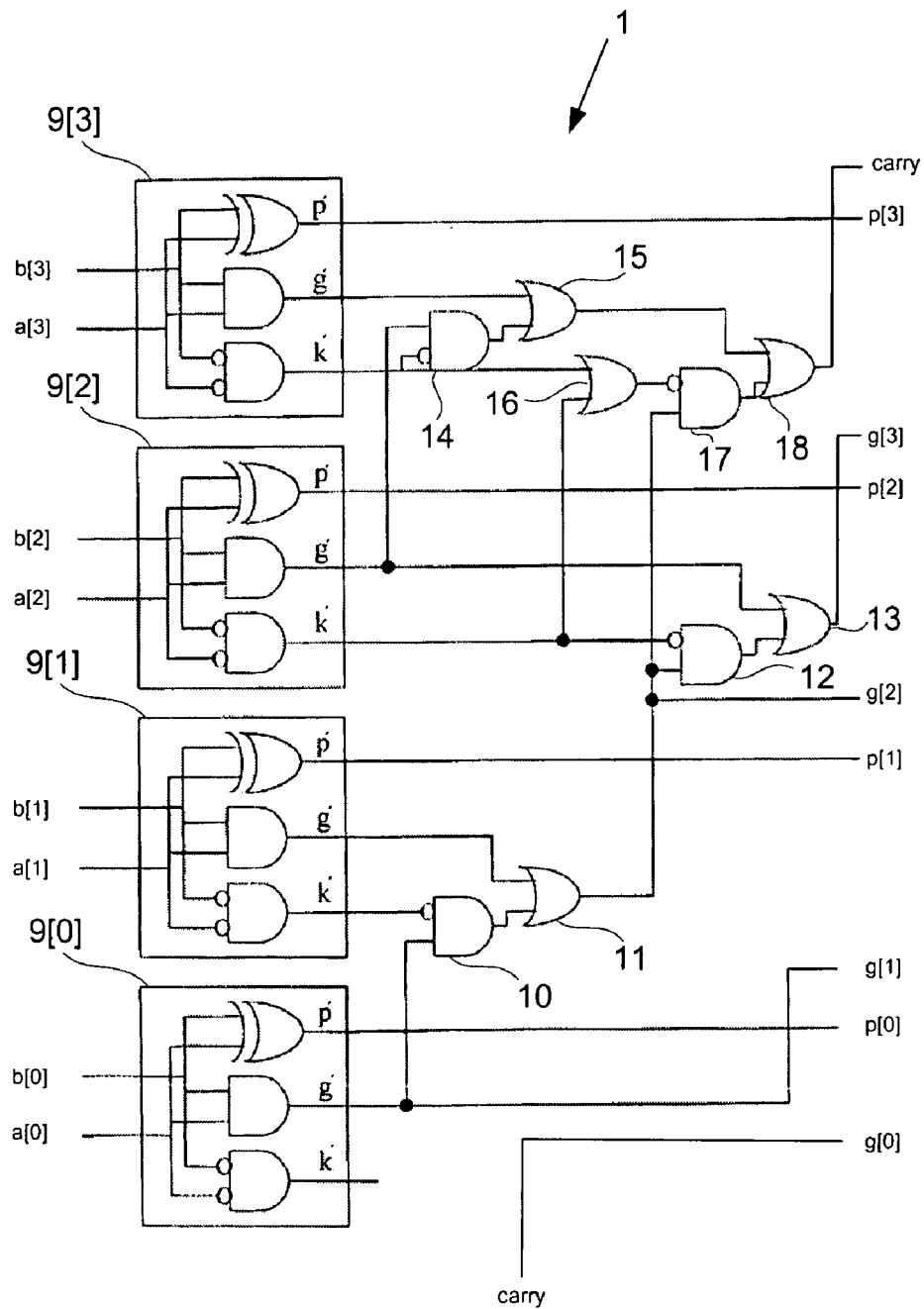
Figure 2 - Prior Art

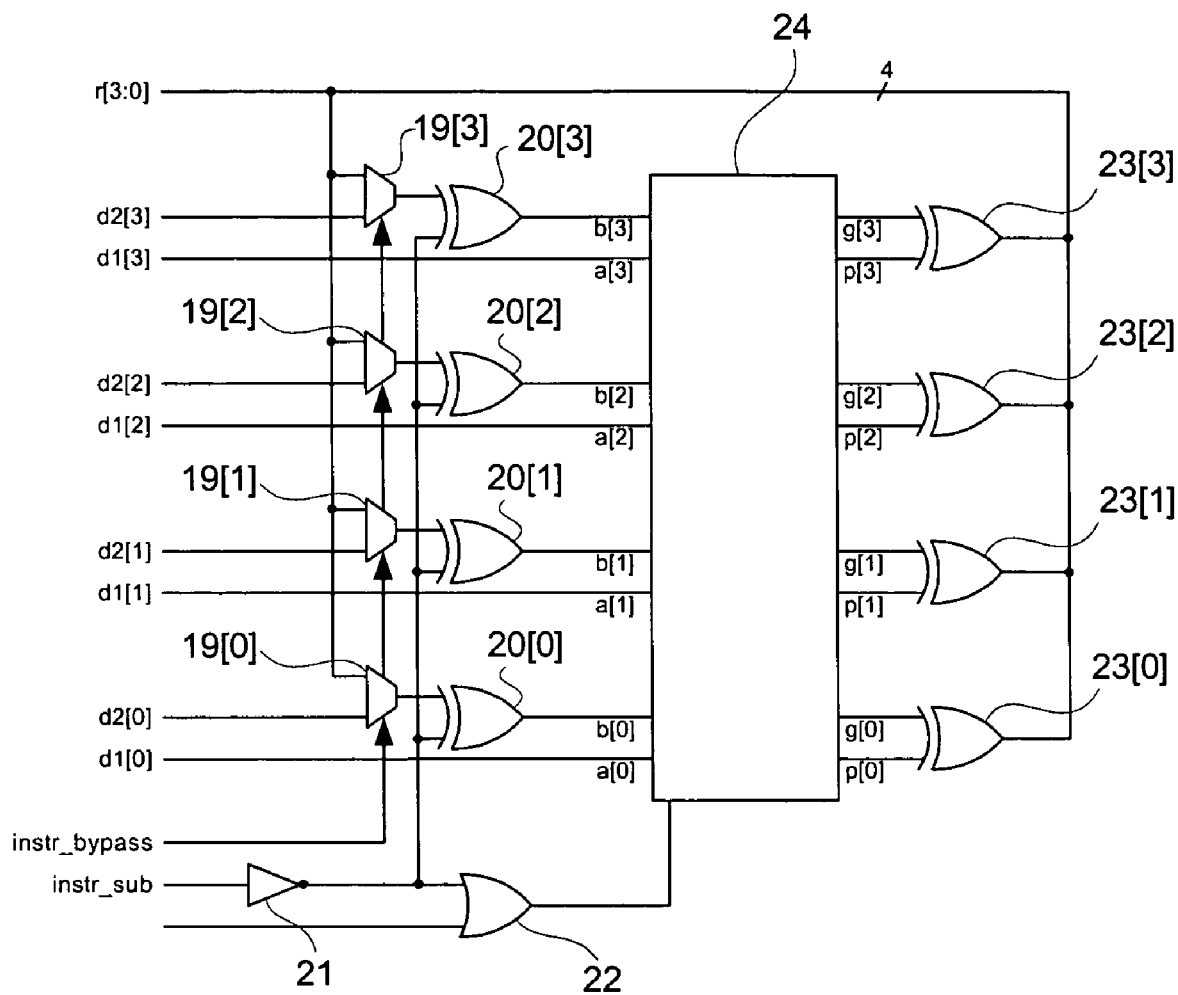
Figure 3 - Prior Art

ADDER-SUBTRACTER CIRCUIT

BACKGROUND OF THE INVENTION

The present invention generally relates to an adder-subtracter circuit with bypass capability which can feed back the result to itself and is used for example in processors and more specifically in digital signal processors, and methods related thereto and used therewith.

The circuit usually is arranged in the data path and can perform adds and subtracts and can bypass the result to itself. The purpose of the bypassing operation can be to adjust the frequency of instruction executions. Especially the frequency of instruction executions can be adjusted to be equal to the frequency of the surrounding components of the processor in which the circuit is used.

One known circuit is depicted in FIG. 3. The known circuit includes a prefix type adder 24 of n bit, n in the described example being 4. The adder 24 for each bit has two n bit inputs a, b and two outputs p, g. The respective output pairs p[0]-g[0], p[1]-g[1], p[2]-g[2] and p[3]-g[3] of each bit are directed to a respective result XOR gate 23 which generates for each bit the result. In the following the bit position is indicated in brackets following the reference. If reference is made to several bit positions then the range of the corresponding bit positions is indicated in brackets. So the plurality of the result XOR gates 23[0], 23[1], 23[2], and 23[3] can be referenced as 23[3:0] and generate the n bit result r[3:0].

The circuit comprises for each bit a first input line d1 and a second input line d2 for inputting a respective bit of a first n bit operand and a second n bit operand respectively. The adder receives the first operand via the input lines d1[0], d1[1], d1[2] and d1[3] directly at the input a. The second operand is directed to one of two n bit inputs of a n bit selector 19. At the other input the selector 19 receives the output r[3:0] of the result XOR gates 23. The selector 19 is controlled by an input line instr_bypass and dependent on the state of this signal forwards the second operand or the result to the output of the selector. The single bits of output signal of the selector are received by first inputs of a plurality of subtract XOR gates 20[3:0] each comprising two inputs. The second inputs of the subtract XOR gates 20[3:0] are receiving an inverted subtract signal instr_sub. Dependent on the state of the subtract signal instr_sub the subtract XOR gates 20[3:0] invert the bits of the output of the selector 19 or not. The result is that the subtract signal instr_sub controls whether the output of the selector 19 is added to or subtracted from the first operand.

Furthermore the circuit comprises a carry_in input line through which a carry bit from a further adder-subtracter circuit can be inputted in order to cascade multiple adder-subtracter circuits. The input line carry_in would receive a carry_out signal of an adder-subtracter circuit processing next less significant bits. In the same way the adder 24 can output a carry_out signal for a further adder-subtracter circuit processing the next more significant bits.

The adder 24 used in the circuit generates its output signals p[3:0] and g[3:0] from it's input signals a[3:0] and b[3:0] by a network of logic gates, the generation of the signals p[3:0] requiring in most cases less gate stages and therefore a smaller time delay than the generation of the signals g[3:0]. Furthermore the external result XOR gates 23[3:0] and the subtract XOR gates 20[3:0] add to the critical path corresponding to the most time consuming data path.

This circuit has the disadvantage that the critical path comprises many gates and therefore reduces the maximum frequency of instruction executions.

The present invention solves the aforementioned exemplary problems, and/or other problems in the art, and provides an adder-subtracter circuit with a reduced number of gates in the critical path and therefore increased maximum frequency of instruction executions.

SUMMARY OF THE INVENTION

The present invention relates to an adder-subtracter circuit for processing a first binary number (d1) of a predetermined plurality of bits and a second binary number (d2) of the predetermined plurality of bits, the circuit being adapted to add the two binary numbers (d1, d2) together or to subtract the two binary numbers (d1, d2) from each other dependent on the state of a subtract signal, being adapted to bypass the result of the processing of the two binary numbers (d1, d2) for processing by the circuit dependent on the state of a bypass signal. The adder-subtracter circuit comprises a subtract logic circuit receiving the second binary number (d2) and the subtract signal for XORing each bit of the second binary number (d2) and the subtract signal to generate an intermediate second binary number (d2');

a select logic circuit receiving the intermediate second binary number (d2') and a feedback binary number (c) to output the second binary number (d2') or the feedback binary number (c) dependent on the state of the bypass signal;

a main logic circuit receiving the output of the select logic circuit and the first binary number (d1) for processing each pair of respective bits from the first binary number (d1) and the output of the select logic circuit to generate a set of intermediate carry terms (p) and a set of summation carry terms (g) relative to bit positions of a sum of the first binary number (d1) and the output of the select logic circuit;

output logic gates for combining the set of the intermediate carry terms (p) with the set of the summation carry terms (g) from the main logic circuit to generate an output (r) related to the result of the processing of the circuit; and a feedback logic circuit receiving the set of the intermediate carry terms (p), the set of the summation carry terms (g) and the subtract signal for processing the received sets to generate a set of intermediate feedback terms (c') by XORing each intermediate carry term (p) with the inverse of the subtract signal and to generate the feedback binary number (c) by bitwise XORing each intermediate feedback term (c') with the respective summation carry term (g).

In a first variant the intermediate carry terms are carry propagate terms (p'). Furthermore the circuit can be adapted such that the main logic circuit processes the received output of the select logic circuit and the first binary number (d1) to generate the set of carry propagate terms (p'), a set of carry generate terms (g') and a set of carry kill terms (k'). The number of bits of the processed number can be for example 4.

In yet another variant the main logic circuit has an carry input for a carry bit, the carry input of the main logic circuit being connected to the output of a carry XOR gate, one of two inputs of the carry XOR gate being connected to the subtract input and the other input of the carry XOR gate being connected to a carry bit input of the circuit.

Further the main logic circuit can comprise an input logic stage and a carry chain, the input logic stage receiving the output of the select logic circuit and the first binary number (d1) and generating carry propagate terms (p'), carry generate terms (g') and a set of carry kill terms (k), and the carry chain receiving the generate terms (g') and the carry kill terms (k') for generating the summation carry terms (g').

These and other advantages, aspects and novel features of the present invention, as well as details of illustrated examples, are more fully understood from the following description and drawings.

BRIEF DESCRIPTION OF THE DRAWINGS

FIG. 2 illustrates the detailed structure an adder for use in the circuit of FIG. 1, and FIG. 3 illustrates a schematic block diagram of a known adder-subtracter circuit.

DETAILED DESCRIPTION OF THE INVENTION

Figure 1:
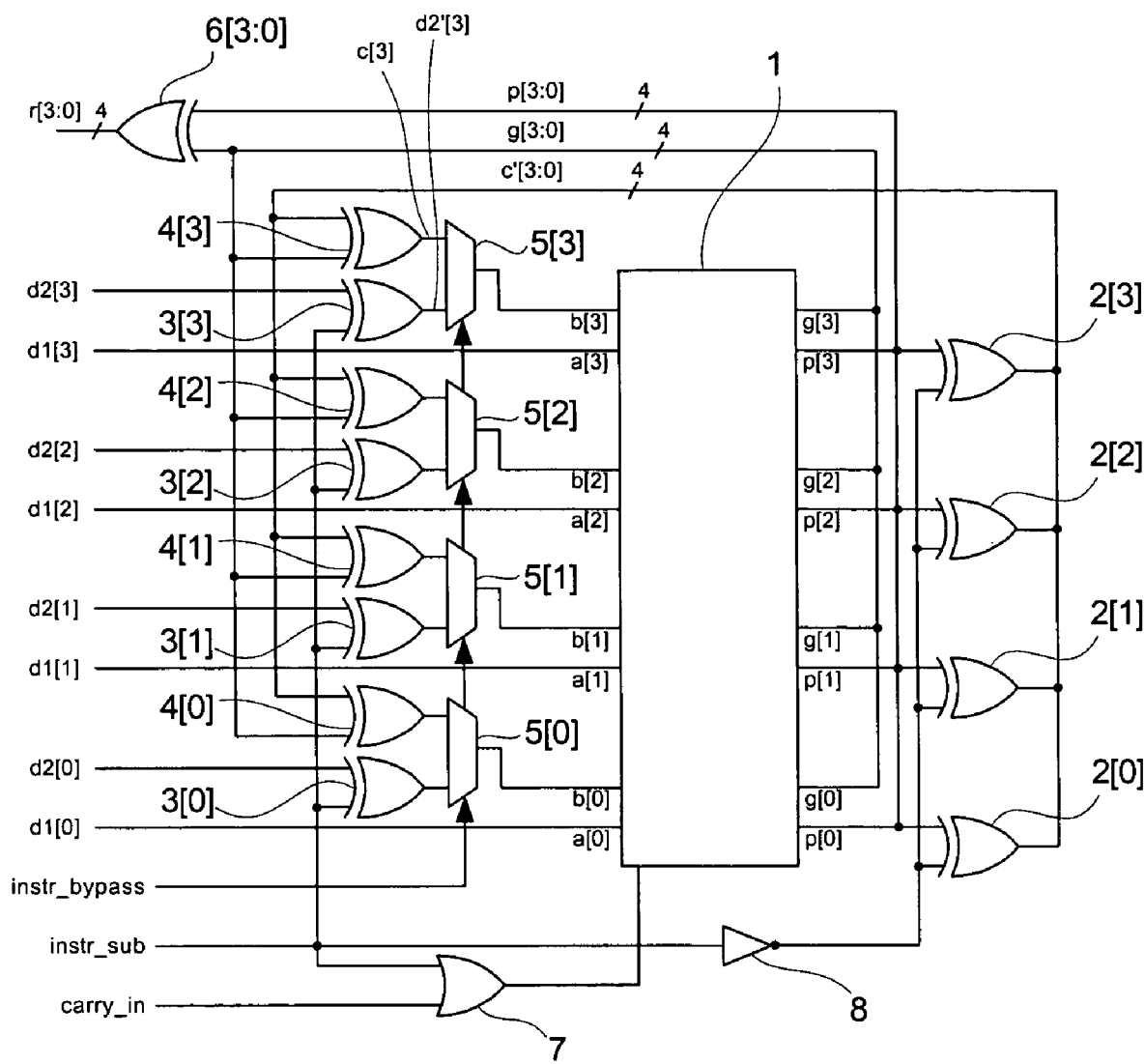
FIG. 1 illustrates a schematic block diagram of a adder-subtracter circuit receiving two n bit operands and generating the sum or the difference of the operands according to one embodiment of the present invention, the circuit being adapted to feed back the result of the processing as one of the operands.

FIG. 1 illustrates a schematic block diagram of an adder-subtracter circuit according to one embodiment of the present invention. The circuit receives a first 4 bit input number d1 and a second 4 bit input number d2 and dependent on the state of a signal instr_sub calculates the sum or the difference of the two input numbers.

Furthermore the circuit is adapted to feed back the result of the calculation dependent on the state of a bypass control signal instr_bypass for alternatively processing the result of the previous calculation instead of the second input number d2.

The single bits of the input numbers are applied by the respective input lines d1[0] to d1[3] and d2[0] to d2[3]. In this specification specific bits of a given signal, input or output with several bits are specified by a postponed bracket with the position(s) or significance(s) of the specific bit or bits.

Core of the circuit is a 4 bit adder 1 which preferably is of the prefix type. The adder 1 comprises two 4 bit inputs a and b. The adder processes the 4 bits of two inputs a[3:0] and b[3:0] in order to generate 4 propagate bits p[3:0] and 4 generate bits g[3:0]. Internally the adder 1 uses prefix computations applied to the inputs a, b in order to generate the generate bits g[3:0].

The outputs p[3:0], g[3:0] are directed to an array of 4 result XOR gates 6[3:0] for generating the 4 bit result r[3:0]. For each bit i one result XOR gate 6[i] receives at its inputs the respective generate bit g[i] and propagate bit p[i]. Each bit i of the result r[i] is calculated by one result XOR gate 6[i] for XORing the propagate bit p[i] with the generate bit g[i].

The first input number d1 is applied to the adder 1 directly at the input a of the adder 1. The second input number d2 is applied to first inputs of subtract XOR gates 3 generating an intermediate second binary number d2'. In figure only the most significant bit d2'[3] of the second binary number d2' is provided with a reference sign. The least significant bit of the second input number d2[0] is applied to one input of the XOR gate 3[0]. The output of the XOR gate 3[0] is applied to one input of a bit selector 5[0]. The output of the bit selector 5[0] is received as bit input b[0] from the adder 1.

The next higher bit d2[1] is applied to one input of the XOR gate 3[1]. The output of the XOR gate 3[1] is applied to one input of a next bit selector 5[1]. The output of the bit selector 5[1] is applied as bit input b[1] to the adder 1. In the same way the next higher bit d2[2] is applied to one input of the XOR gate 3[2] and the output of the XOR gate 3[2] is applied to one input of the next bit selector 5[2], the output of the selector 5[2] being applied to the adder 1 as bit input b[2]. Finally the most significant bit d2[3] is applied to the XOR gate 3[3]. The output of the XOR gate 3[3] is applied to one input of the highest order bit selector 5[3], the output of this selector 5[3] being directed to the adder 1 as bit input b[3].

The other inputs of all subtract XOR gates 3[0] to 3[3] receive the input signal instr_sub. Due to the XORing with the signal instr_sub the bits of the second input number d2 dependent on the sate of the signal instr_sub are inverted or not.

The other inputs of the selectors 5[3:0] connect to respective outputs of further subtract XOR gates 4[0] to 4[3]. The XOR gates 4[0] to 4[3] receive at their inputs the respective generate bits g[0] to g[3] and respective outputs of pre subtract XOR gates 2[0] to 2[3] and generate a feedback binary number c. In figure only the most significant bit c[3] of the feedback binary number c is provided with a reference sign.

Each pre subtract XOR gate 2[i] receives at its inputs the respective propagate bit p[i] and the inverse of the signal instr_sub. The pre subtract XOR gates 2[3:0] generate an intermediate feedback binary number c'[3:0]. The pre subtract XOR gate 2[0] receives at one input the least significant propagate bit p[0] and at the other input the inverted signal instr_sub. The output of the XOR gate 2[0] is applied to one input of the XOR gate 4[0]. The next higher XOR gate 2[1] receives at one input the next higher propagate bit p[1] and also at its other input the inverted signal instr_sub. Accordingly the next higher XOR gate 2[2] receives at one input the next higher propagate bit p[2] and the XOR gate 2[3] processing the most significant bit receives at one input the most significant propagate bit p[3], both XOR gates 2[2] and 2[3] receiving at their other inputs the inverted signal instr_sub.

The output of the XOR gate 4[0] connects to one input of the selector 5[0], the output of the XOR gate 4[1] connects to one input of the selector 5[1], the output of the XOR gate 4[2] connects to one input of the selector 5[2] and the output of the XOR gate 4[3] connects to one input of the selector 5[3].

All bit selectors 5[0] to 5[3] are controlled by the signal instr_bypass such that dependent of this signal all selectors 5[3:0] forward the respective bits of the second input number d2 or the outputs of the respective XOR gates 4[0] to 4[3] to the input b[3:0] of the adder 1.

FIG. 2 is a logic circuit diagram of a possible example of an implementation of an adder 1. The adder shown is a 4 bit adder, that is to say, for adding two 4 bit numbers, corresponding to the 4 bit circuit. However the circuit and the adder used in the circuit can have more or less bits. Furthermore the adder 1 in the circuit can be substituted by two or more cascaded adders in order to use adder with less bits than processed by the circuit.

FIG. 2 shows 4 logic blocks 9[0] to 9[3] forming the first stage of the adder 1. Within each block, the logic includes an AND gate and an XOR gate for processing the respective bits from the inputs a, b. The AND gate produces a first level term g'; whereas the XOR gate produces the first level term p'. The respective bits of the inputs a, b are also applied through inverters to another AND gate to produce a first level kill term k'.

In the adder 1 the propagate terms p' are passed directly as the propagate bits p to the result XOR gates 6[3:0] that form the output stage. The logic blocks 9[0] to 9[3] pass respective generate terms g' and kill terms k' to a carry chain formed by logic gates between the first stage and the output stage. The drawing provides one example of the prefix graph logic of the carry chain for a simple 4 bit adder. Nevertheless other structures of the carry chain and the fist stage are conceivable as long as they produce the propagate bits p[3:0] and the generate bits g[3:0].

In this simple example the result XOR gate 6[0] receives the p[0] propagate bit from the lowest order block 9[0]. The other input of the result XOR gate 6[0] connects to the carry input of the adder 1 receiving the output of the carry OR gate 7.

The binary output of the result XOR gate 6[0] represents the lowest order bit of the result of the adder 1 in the drawing. The kill term k' of the lowest order block 9[0] is not used.

The result XOR gate 6[1] receives the propagate term p' as propagate bit p[1] from the next higher order block 9[1]. The other input of the result XOR gate 2[1] uses the generate term g' directly from the first block 9[0] as generate bit g[1]. The binary output of the result XOR gate 6[1] represents the result bit r[1] of the output result.

The generate term g' from the lowest order block 9[0] is also applied to one input of an AND gate 10, which receives the inverse of the kill term k' from the next higher block 9[1]. An OR gate 11 receives the output of the AND gate 10 as well as the generate term g' from the block 9[1] and produces the final generate bit g[2]. A result XOR gate 6[] processes the generate bit g[2] from the carry chain and the propagate term p' from the block 9[2] as propagate bit p[2] to produce the binary output for the third bit position of the result r[2].

An AND gate 12 receives the g[2] signal from the OR gate 11. The AND gate 12 also receives the inverse of the kill term k' from the next higher block 9[2] for the third input bit position. An OR gate 13 receives the output of the AND gate 12 as well as the generate term g' from the block 9[2] and produces the final generate bit g[3]. A result XOR gate 6[3] processes the generate bit g[3] from the carry chain and the propagate term p' from the highest order block 9[3] as propagate bit p[3]. The binary output of the result XOR gate 6[3] represents the result bit r[3] of the sum of the two 4 bit numbers inputted at the inputs a and b.

In this example the generate term g' from the block 9[2] is also applied to one input of an AND gate 14 which receives the inverse of the kill term k' from the next higher block , in this case the highest order block 9[3]. An OR gate 15 receives the output of the AND gate 14 as well as the generate term g' from the block 9[3].

The block 9[3] also supplies the kill term k' to an OR gate 16. At its other input the OR gate 16 receives the kill term k' from the block 9[2]. The output of the OR gate 16 is inverted and applied to one input of an AND gate 17. In that gate the inverse of that signal from the OR gate 16 is ANDed with the generate bit g[2] received from the OR gate 11.

The OR gate 15 provides its output signal to one input of a further OR gate 18. The OR gate 18 also receives the output signal from the AND gate 17. The output of the OR gate 18 would represent the generate bit for the next higher bit position g[4]. In this adder 1 the signal g[4] represents the overall carry output which can be used as carry input for a further adder processing the next higher bits. If there is no further adder the generate bit g[4] is not used and the respective gates 14 to 18 for generating this signal can be omitted.

As shown in the above description of the adder 1 the data paths for generating the generate bits g[3:0] and the propagate bits p[3:0] comprise different numbers of gates which result in different time delays. The processing of all propagate bits p[3:0] comprise one stage of gates in the blocks 9[3:0] and therefore only one gate delay.

The processing of the generate bit g[1] also requires only one stage of gates in the lowest order block 9[0] since the generate term g' from the block 9[0] can be used directly as generate bit g[1]. The processing of the generate bit g[2] involves the gates 10, 11 and gates from the blocks 9[0] and 9[1] and thus comprises three gate stages. The processing of the generate bit g[3] involves the gates 10 to 13 and gates from the blocks 9[0] to 9[2] and thus comprises five gate stages. From the aforementioned it becomes clear that processing delay of the adder is determined by the delay of the processing of the higher order generate bits, that is to say the generate bit g[3] if the carry out bit or generate bit g[4] which in this environment is not used is not taken into account.

In order to increase the maximum processing frequency according to the present invention the processing path for the generate bits g[3:0] and the propagate bits p[3:0] are designed in such different manner that the maximum overall gate delay in the complete circuit for the generate bits g[3:0] can be reduced taking advantage of the fact that for the generating of the result r[3:0] and for subtraction of the result r[3:0] in the feedback mode XOR gates are required. By combining this XOR gates in the processing path of the generate bits g[3:0] which are the critical due to the increased gate delay already inside the adder 1 and adapting the processing path for the propagate bits p[3:0] to the modified path for the generate bits g[3:0] the critical overall gate delay can be reduced and therefore the maximum processing speed can be increased.

As described above the invention provides an adder-subtracter circuit for processing a first binary number (d1) of a predetermined plurality of bits and a second binary number (d2) of the predetermined plurality of bits, the circuit being adapted to add the two binary numbers (d1, d2) together or to subtract the two binary numbers (d1, d2) from each other dependent on the state of a subtract signal (instr_sub), being adapted to bypass the result of the processing of the two binary numbers (d1, d2) for processing by the circuit dependent on the state of a bypass signal (instr_bypass). The adder-subtracter circuit comprises a subtract logic circuit (3) receiving the second binary number (d2) and the subtract signal for XORing each bit of the second binary number (d2) and the subtract signal to generate an intermediate second binary number (d2');

a select logic circuit (5) receiving the intermediate second binary (d2') number and a feedback binary number (c) to output the second binary number (d2') or the feedback binary number (c) dependent on the state of the bypass signal (instr_bypass);

a main logic circuit (1) receiving the output of the select logic circuit (5) and the first binary number (d1) for processing each pair of respective bits from the first binary number (d1) and the output of the select logic circuit (5) to generate a set of intermediate carry terms (p) and a set of summation carry terms (g) relative to bit positions of a sum of the first binary number (d1) and the output of the select logic circuit (5);

output logic gates (6) for combining the set of the intermediate carry terms (p) with the set of the summation carry terms (g) from the main logic circuit (1) to generate an output (r) related to the result of the processing of the circuit; and a feedback logic circuit receiving the set of the intermediate carry terms (p), the set of the summation carry terms (g) and the subtract signal (instr_sub) for processing the received sets to generate a set of intermediate feedback terms (c') by XORing (2) each intermediate carry term (p) with the inverse of the subtract signal (instr_sub) and to generate the feedback binary number (c) by bitwise XORing (4) each intermediate feedback term (c') with the respective summation carry term (g).

In a first variant the intermediate carry terms are carry propagate terms (p'). Furthermore the circuit can be adapted such that the main logic circuit (1) processes the received output of the select logic circuit (5) and the first binary number (d1) to generate the set of carry propagate terms (p'), a set of carry generate terms (g') and a set of carry kill terms (k'). The number of bits of the processed number can be for example 4.

In yet another variant the main logic circuit (1) has an carry input for a carry bit, the carry input of the main logic circuit (1) being connected to the output of a carry XOR gate (7), one of two inputs of the carry XOR gate (7) being connected to the subtract input (instr_sub) and the other input of the carry XOR gate (7) being connected to a carry bit input of the circuit.

Further the main logic circuit (1) can comprise an input logic stage (9) and a carry chain (10-8), the input logic stage (9) receiving the output of the select logic circuit (5) and the first binary number (d1) and generating carry propagate terms (p'), carry generate terms (g') and a set of carry kill terms (k'), and the carry chain (10-18) receiving the generate terms (g') and the carry kill terms (k') for generating the summation carry terms (g).

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

We claim:

1. An adder-subtracter circuit for processing a first binary number of a predetermined plurality of bits and a second binary number of the predetermined plurality of bits, the circuit being adapted to add the two binary numbers together or to subtract the two binary numbers from each other dependent on the state of a subtract signal, being adapted to bypass the result of the processing of the two binary numbers for processing by the circuit dependent on the state of a bypass signal and comprising:

a subtract logic circuit receiving the second binary number and the subtract signal for XORing each bit of the second binary number and the subtract signal to generate an intermediate second binary number;

a select logic circuit receiving the intermediate second binary number and a feedback binary number to output the second binary number or the feedback binary number dependent on the state of the bypass signal;

a main logic circuit receiving the output of the select logic circuit and the first binary number for processing each pair of respective bits from the first binary number and the output of the select logic circuit to generate a set of intermediate carry terms and a set of summation carry terms relative to bit positions of a sum of the first binary number and the output of the select logic circuit;

output logic gates for combining the set of the intermediate carry terms with the set of the summation carry terms from the main logic circuit to generate an output related to the result of the processing of the circuit; and a feedback logic circuit receiving the set of the intermediate carry terms, the set of the summation carry terms and the subtract signal for processing the received sets to generate a set of intermediate feedback terms by XORing each intermediate carry term with the inverse of the subtract signal and to generate the feedback binary number by bitwise XORing each intermediate feedback term with the respective summation carry term.

2. The circuit of claim 1, in which the intermediate carry terms are carry propagate terms.

3. The circuit of claim 2, in which the main logic circuit is adapted to process the received output of the select logic circuit and the first binary number to generate the set of carry propagate terms, a set of carry generate terms and a set of carry kill terms.

4. The circuit of claim 1, in which n is 4.

5. The circuit of claim 1, in which the main logic circuit has an carry input for a carry bit, the carry input of the main logic circuit being connected to the output of a carry XOR gate, one of two inputs of the carry XOR gate being connected to the subtract input and the other input of the carry XOR gate being connected to a carry bit input of the circuit.

6. The circuit of claim 1, in which the main logic circuit comprises an input logic stage and a carry chain, the input logic stage receiving the output of the select logic circuit and the first binary number and generating carry propagate terms, carry generate terms and a set of carry kill terms, and the carry chain receiving the generate terms and the carry kill terms for generating the summation carry terms.

7. A circuit for processing a first binary number of a predetermined plurality of bits and a second binary number of the predetermined plurality of bits, the circuit being adapted to add the two binary numbers together or to subtract the two binary numbers from each other dependent on the state of a subtract signal, being adapted to bypass the result of the processing of the two binary numbers for processing by the circuit dependent on the state of a bypass signal and comprising:

first means for receiving the second binary number and the subtract signal for XORing each bit of the second binary number and the subtract signal to generate an intermediate second binary number;

second means for receiving the intermediate second binary number and a feedback binary number to output the second binary number or the feedback binary number dependent on the state of the bypass signal;

third means for receiving the output of the second means and the first binary number for processing each pair of respective bits from the first binary number and the output of the second means to generate a set of intermediate carry terms and a set of summation carry terms relative to bit positions of a sum of the first binary number and the output of the second means;

fourth means for combining the set of the intermediate carry terms with the set of the summation carry terms from the third means to generate an output related to the result of the processing of the circuit; and fifth means for receiving the set of the intermediate carry terms, the set of the summation carry terms and the subtract signal for processing the received sets to generate a set of intermediate feedback terms by XORing each intermediate carry term with the inverse of the subtract signal and to generate the feedback binary number by bitwise XORing each intermediate feedback term with the respective summation carry term.

* * * * *